United States Patent
Guan

(10) Patent No.: US 11,941,242 B2
(45) Date of Patent: Mar. 26, 2024

(54) ENTRY INFORMATION PROCESSING METHOD, TERMINAL DEVICE, AND COMPUTER-READABLE STORAGE MEDIUM

(71) Applicant: NETEASE (HANGZHOU) NETWORK CO., LTD., Zhejiang (CN)

(72) Inventor: Hongyue Guan, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 17/756,318

(22) PCT Filed: Jan. 22, 2020

(86) PCT No.: PCT/CN2020/073732
§ 371 (c)(1),
(2) Date: May 23, 2022

(87) PCT Pub. No.: WO2021/128537
PCT Pub. Date: Jul. 1, 2021

(65) Prior Publication Data
US 2022/0413672 A1    Dec. 29, 2022

(30) Foreign Application Priority Data

Dec. 26, 2019    (CN) .......................... 201911365849.8

(51) Int. Cl.
*G06F 3/0488*    (2022.01)
*G06F 3/0482*    (2013.01)

(52) U.S. Cl.
CPC .......... *G06F 3/0488* (2013.01); *G06F 3/0482* (2013.01)

(58) Field of Classification Search
CPC ............................ G06F 3/0482; G06F 3/0488
See application file for complete search history.

(56) References Cited

U.S. PATENT DOCUMENTS

| | | | |
|---|---|---|---|
| 2009/0183100 A1* | 7/2009 | Eom | G06F 3/04883 |
| | | | 715/769 |
| 2016/0034164 A1* | 2/2016 | High | G06F 16/904 |
| | | | 715/773 |

(Continued)

FOREIGN PATENT DOCUMENTS

| | | |
|---|---|---|
| CN | 103019589 A | 4/2013 |
| CN | 103530041 A | 1/2014 |

(Continued)

OTHER PUBLICATIONS

The International Search Report dated Sep. 24, 2020 for PCT International Application No. PCT/CN2020/073732.

(Continued)

*Primary Examiner* — Seth A Silverman
(74) *Attorney, Agent, or Firm* — Qinghong Xu

(57) ABSTRACT

Provided in the present invention are an entry information processing method, a terminal device, and a computer-readable storage medium. The method comprises: in response to a slide operation with respect to entry information, determining a target event corresponding to the slide operation, then, when the slide distance of the slide operation reaches a first threshold, activating the target event, and then, when the slide distance reaches a second threshold, processing the entry information according to the target event, where the second threshold is greater than the first threshold.

14 Claims, 8 Drawing Sheets

(56) References Cited

U.S. PATENT DOCUMENTS

| | | | |
|---|---|---|---|
| 2016/0266758 A1* | 9/2016 | Li | ............................ G06F 3/0482 |
| 2017/0357423 A1 | 12/2017 | O'Brien et al. | |
| 2019/0079665 A1* | 3/2019 | Xian | .................. H04M 1/27475 |
| 2019/0138201 A1* | 5/2019 | Li | ............................ G06V 40/67 |

FOREIGN PATENT DOCUMENTS

| | | |
|---|---|---|
| CN | 103530047 A | 1/2014 |
| CN | 103761036 A | 4/2014 |
| CN | 104065615 A | 9/2014 |
| CN | 104133639 A | 11/2014 |
| CN | 104636047 A | 5/2015 |
| CN | 106559577 A | 4/2017 |
| CN | 106682462 A | 5/2017 |
| CN | 107847652 A | 3/2018 |
| CN | 108139848 A | 6/2018 |
| CN | 109976643 A | 7/2019 |
| KR | 101470442 B1 | 12/2014 |

OTHER PUBLICATIONS

The 1st Office Action dated Sep. 24, 2020 for Chinese Patent Application No. 201911365849.8.
Yoni Heisler, Apple releases iOS 10.3 for iPhone and iPad owners, issued on Dec. 31, 2017.
Kaixi Fan, Information Intraction Design, issued on Feb. 28, 2015.
The 2nd Office Action dated Dec. 10, 2020 for Chinese Patent Application No. 201911365849.8.
Notification to Grant Patent Right dated May 19, 2021 for Chinese Patent Application No. 201911365849.8.

* cited by examiner

ENTRY INFORMATION PROCESSING METHOD, TERMINAL DEVICE, AND COMPUTER-READABLE STORAGE MEDIUM

CROSS-REFERENCE

The present application is the 371 application of PCT Application No. PCT/CN2020/073732, filed on Jan. 22, 2020, which is based on and claims priority to the Chinese Patent Application No. 201911365849.8, entitled "ENTRY INFORMATION PROCESSING METHOD, TERMINAL DEVICE, AND COMPUTER-READABLE STORAGE MEDIUM", filed on Dec. 26, 2019, the entire contents of both of which are hereby incorporated by reference.

TECHNICAL FIELD

The present disclosure relates to the field of computer technology, and in particular, to an entry information processing method, a terminal device, and a computer-readable storage medium.

BACKGROUND

With the popularization and development of terminal devices, users can perform touch operations on the terminal screen to process information. A scenario of deleting information is taken as an example. In some situations, a delete button will be displayed on the terminal screen, and the user can click the delete button to implement deletion. However, in most scenarios, for example, for entry information of a list type, a delete button will generally not be provided separately for each piece of entry information. In this case, the user needs to perform operations such as long pressing or sliding, and in response to the operations, the delete button is displayed on the terminal screen. Then, the user can implement deletion by clicking the delete button.

In the existing scenario of information deletion, the deletion operation is generally completed by calling out the delete button and then clicking the delete button. In this process, there are corresponding defects regardless of whether a secondary confirmation process is involved or not.

SUMMARY

The present disclosure provides a method for processing entry information, a terminal device, and a computer-readable storage medium.

In a first aspect, the present disclosure provides a method for processing entry information, including:

in response to a sliding operation for entry information, determining a target event corresponding to the sliding operation;

activating the target event when a sliding distance of the sliding operation reaches a first threshold; and processing the entry information according to the target event when the sliding distance reaches a second threshold, wherein the second threshold is greater than the first threshold.

In a second aspect, the present disclosure provides a terminal device, including:

a determining module configured to, in response to a sliding operation for entry information, determine a target event corresponding to the sliding operation;

an activating module configured to activate the target event when a sliding distance of the sliding operation reaches a first threshold; and a processing module configured to process the entry information according to the target event when the sliding distance reaches a second threshold, wherein the second threshold is greater than the first threshold.

In a third aspect, the present disclosure provides a device for processing entry information, including:

a memory;
a processor; and
a computer program, wherein the computer program is stored in the memory and configured to be executed by the processor to implement the method in the first aspect.

In a fourth aspect, the present disclosure provides a computer-readable storage medium having a computer program stored thereon, wherein the computer program is executed by a processor to implement the method as described in the first aspect.

DETAILED DESCRIPTION

Exemplary embodiments will be described in detail here, examples of which are illustrated in the accompanying drawings. When the following description refers to the accompanying drawings, the same numerals in different drawings represent the same or similar elements unless otherwise indicated. The implementations described in the following exemplary embodiments do not represent all implementations consistent with the present disclosure. Rather, they are merely examples of devices and methods consistent with some aspects of the present disclosure as detailed in the appended claims.

The method for processing entry information provided by the embodiments of the present disclosure can be applied to any terminal device provided with a touch screen. The user can perform a touch operation on the touch screen to manipulate the terminal device.

The terminal device involved in the embodiments of the present disclosure may be a wireless terminal or a wired terminal. The wireless terminal may be a device that provides voice and/or other service data connectivity to a user, a handheld device with wireless connectivity, or other processing device connected to a wireless modem. The wireless terminal can communicate with one or more core network devices via a Radio Access Network (RAN), and the wireless terminal can be a mobile terminal, such as a mobile phone (or "cellular" phone) and a computer with a mobile terminal, for example, a portable mobile device, a pocket-sized mobile device, a hand-held mobile device, a mobile device built in a computer or a vehicle-mounted mobile device, that exchanges language and/or data with the wireless access network. For another example, the wireless terminal may also be other devices such as a Personal Communication Service (PCS) phone, a cordless phone, a Session Initiation Protocol (SIP) phone, or a Wireless Local Loop (WLL) station, a Personal Digital Assistant (Personal Digital Assistant, PDA). The wireless terminal may also be referred to as a system, a subscriber unit, a subscriber station, a mobile station, a mobile console, a remote station, a remote terminal, an Access Terminal, a User Terminal, a User Agent, a User Device or User Equipment, which are not limited here. Optionally, the above-mentioned terminal device may also be a device such as a smart watch, a tablet computer, or the like.

A specific application scenario of the present disclosure is an information processing scenario for the entry information. Specifically, it may include, but is not limited to: a scenario of deleting information, a scenario of hiding a message, a scenario of marking a message, and a scenario of communicating with a user to which the information belongs. The implementations in these scenarios will be described in detail later.

Figure 1:
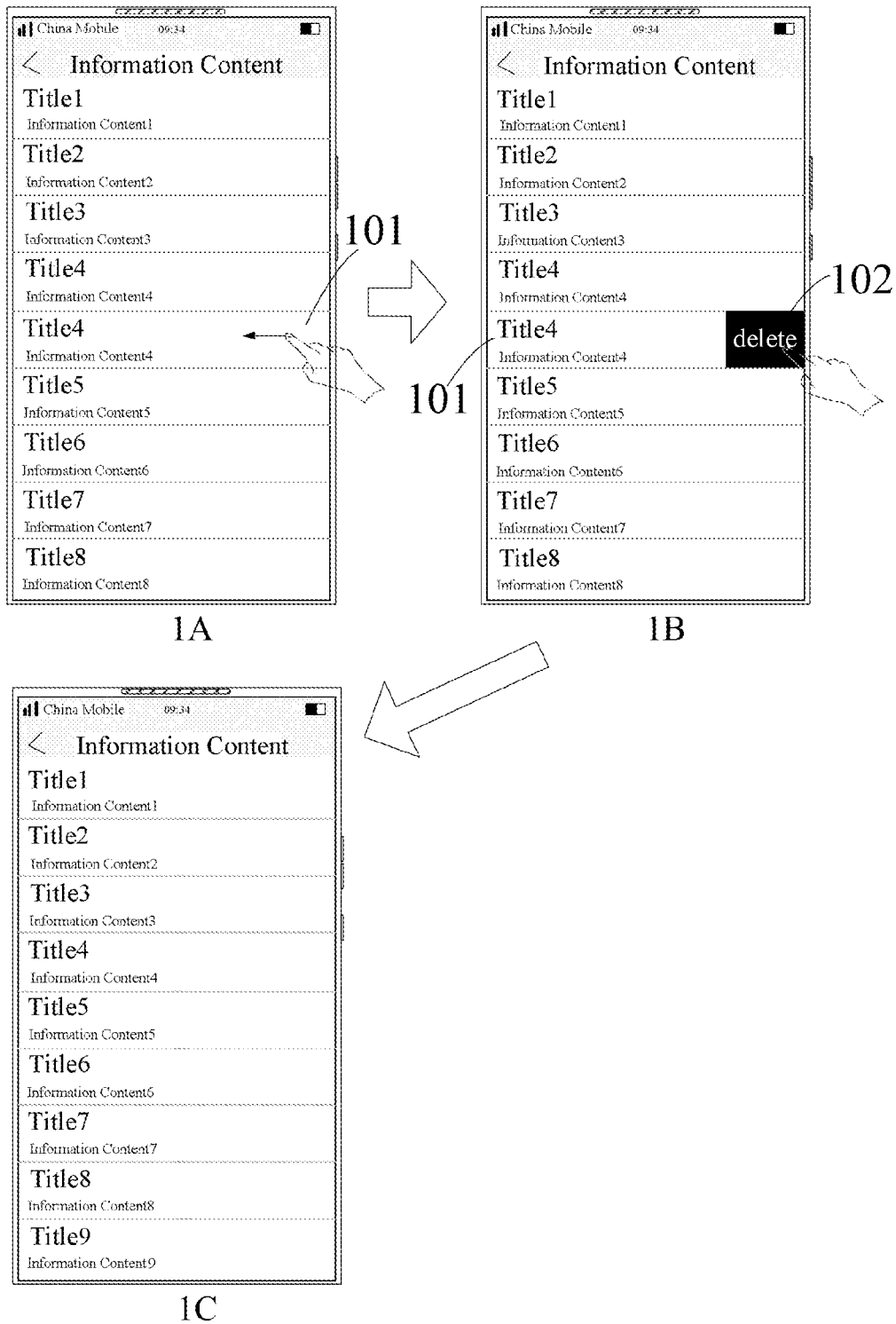
FIG. 1 is a schematic diagram of an information processing method in the related art.

The scenario of deleting information is taken as an example. For example, FIG. 1 shows a schematic diagram of an information processing method in the related art. FIG. 1A shows an information display interface, and specifically displays a plurality of pieces of entry information (8 pieces of entry information are shown in FIG. 1A), and each piece of entry information includes a title and information content. In this case, the user can slide to the left on any piece of entry information, such as sliding to the left on entry information 101 in FIG. 1A, and at this time, the display interface is as shown in FIG. 1B. In FIG. 1B, a delete button 102 is displayed on the right side of the entry information 101. In this way, the user can click the delete button 102, and the display interface of the terminal is as shown in FIG. 1C, in which the entry information 101 is deleted, and the entry information 101 is no longer included in the information display interface.

As shown in FIG. 1, in such an information deletion scenario, a touch operation needs to be performed first to cause a delete button to be displayed on the display interface, and in response to the operation of clicking the delete button by the user, the entry information is deleted. This information processing method requires the user to perform two operations before the information can be deleted, and the operation process is disconnected and has obvious interruption, which results in poor user experience. In addition, this method of deleting information does not have secondary confirmation, and the deletion is completed immediately once the user clicks the delete button, which also easily leads to the problem of information loss caused by mistaken deletion of information. However, if the second confirmation is added on the basis of the embodiment shown in FIG. 1, the user operations will be further increased, resulting in more cumbersome and complicated information deletion process and poor user experience.

The technical solutions provided by the present disclosure aim to solve the above technical problems in the related art.

The technical solutions of the present disclosure and how the technical solutions of the present application solve the above-mentioned technical problems will be described in detail below in connection with specific embodiments. The following specific embodiments may be combined with each other, and the same or similar concepts or processes may not be repeated in some embodiments. The embodiments of the present disclosure will be described below with reference to the accompanying drawings.

Embodiment 1

An embodiment of the present disclosure provides a method for processing entry information.

Figure 2:
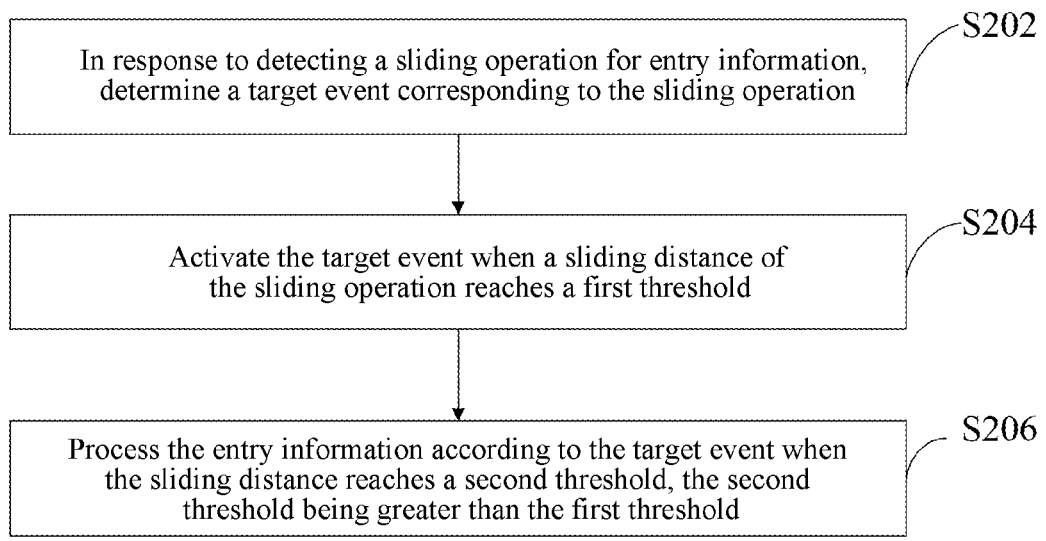
FIG. 2 is a schematic flowchart of a method for processing entry information provided by an embodiment of the present disclosure.
Figure 3:
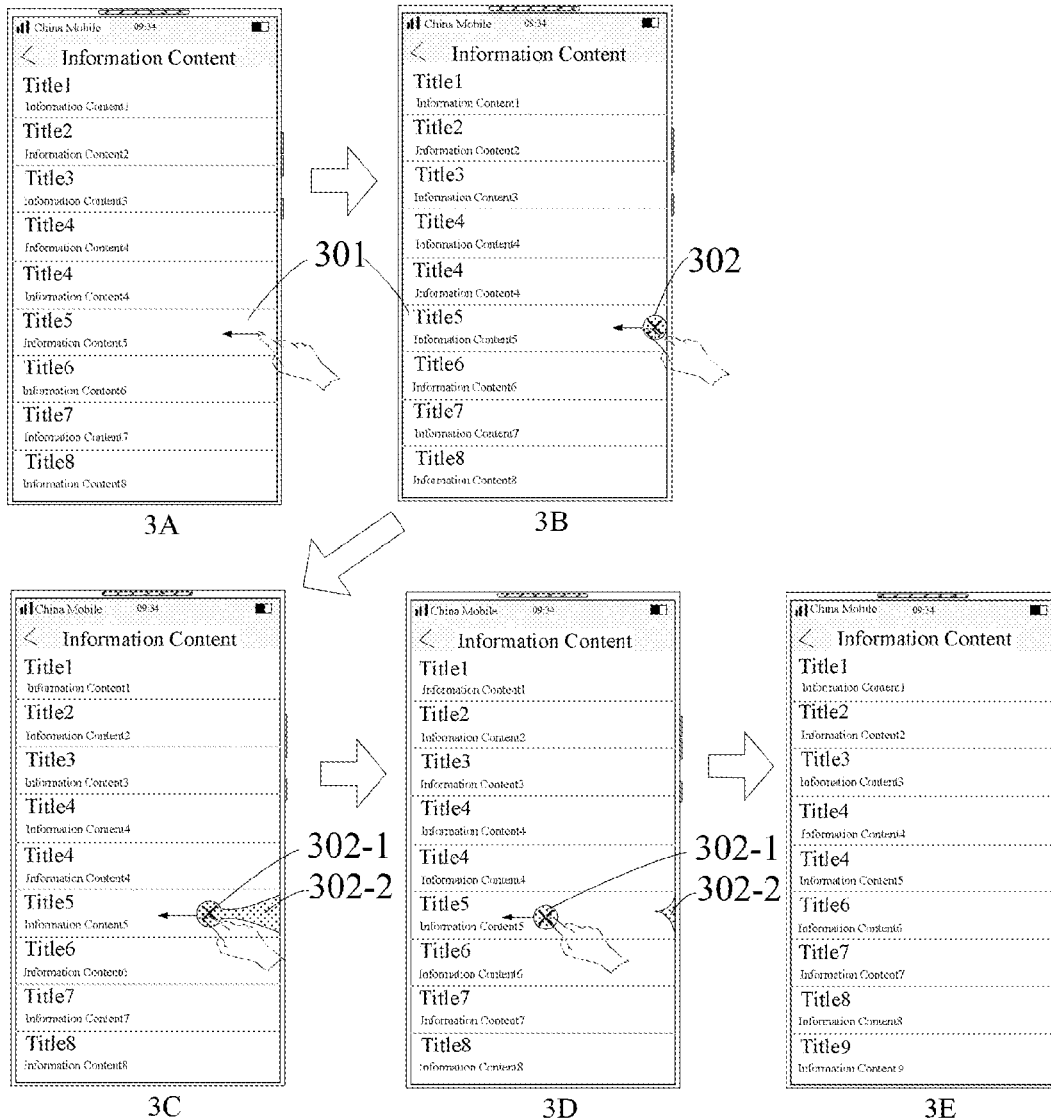
FIG. 3 is a schematic diagram of a display interface for a method for processing entry information provided by an embodiment of the present disclosure.

Referring to FIG. 2 and FIG. 3, FIG. 2 is a schematic flowchart of a method for processing entry information provided by an embodiment of the present disclosure, and FIG. 3 is a schematic diagram of a display interface for another method for processing entry information provided by an embodiment of the present disclosure.

As shown in FIG. 2, the method for processing entry information includes steps S202 to S206.

In S202, in response to a sliding operation for entry information, a target event corresponding to the sliding operation is determined.

As shown in FIG. 3, FIG. 3A is an information display interface similar to that of FIG. 1A. In this display interface, the user can perform a sliding operation for any entry information. As shown in FIG. 3A, if the user slides to the left at the entry information 301 (sliding to the left is only an example, and in an actual scenarios, there is no such restriction, which will be described in detail later), the terminal device can acquire operation information of the sliding operation, and accordingly determine a target event corresponding to the sliding operation.

The target event involved in the embodiments of the present disclosure may include, but are not limited to, a deletion event, a marking event, a hiding event, or a communication event. These events and the method for determining the target events will be described in detail later.

In this step, when the sliding operation for the entry information is detected, an event prompt control for the target event can be displayed.

Description is given in an example where the target event in the scenario shown in FIG. 3 is the deletion event. As mentioned above, when the user slides to the left at the entry information 301, and the target event corresponding to the sliding operation is the deletion event. In this case, as shown in FIG. 3B, a deletion prompt control 302 may be presented on the right side of the entry information 301. At this time, the deletion function is not activated, and the deletion prompt control 302 is used to prompt the user that the entry information 301 can be deleted by continuing to slide to the left. The user does not need to perform other processing on the deletion prompt control 302.

In this case, as shown in FIG. 3, a sliding distance has not yet reached a first threshold, and only a main body of the event prompt control 302 (i.e., 302-1) is displayed.

In S204, when the sliding distance of the sliding operation reaches the first threshold, the target event is activated.

In an embodiment of the present disclosure, the sliding distance of the current sliding operation may be acquired in real time, and it is determined whether to activate the target event or not according to the relationship between the sliding distance and the first threshold.

It should be noted that activating the target event is not equivalent to triggering the target event. The target event can be triggered only after it is activated. For example, in the scenario of deleting the target event, when the sliding distance reaches the first threshold, the function of deleting the entry information can be activated, and then deletion of the entry information is triggered when the sliding distance reaches the second threshold.

In this process, the event prompt control can be controlled to move continuously with the sliding operation, which can give the user an intuitive visual prompt, and it is convenient for the user to operate.

For example, on the basis of FIG. 3B, if the user's finger continues to slide to the left, a display interface as shown in FIG. 3C is presented. In this process, if the sliding distance does not reach the second threshold, the deletion prompt control 302 is presented in a first form as shown in FIG. 3C. In the first form, the deletion prompt control 302 includes a main body 302-1 and an adhesive part 302-2, and the main body 302-1 is connected with the adhesive part 302-2 and moves continuously with the sliding operation. An end of the adhesive part 302-2 is fixed to a start point of the sliding operation (or a screen edge on the right side, or a side edge of the entry information), and the other end of the adhesive part 302-2 is connected to the main body 302-1. In this way, when the sliding distance does not reach the second threshold, the main body 302-1 continuously moves to the left with the sliding operation by the user, and the adhesive portion 302-2 can be presented in such a form that a flexible material is being stretched.

It can be understood that the display interface shown in FIG. 3C is only a possible embodiment, and the display interface can be presented in other forms in actual scenarios.

Figure 4:
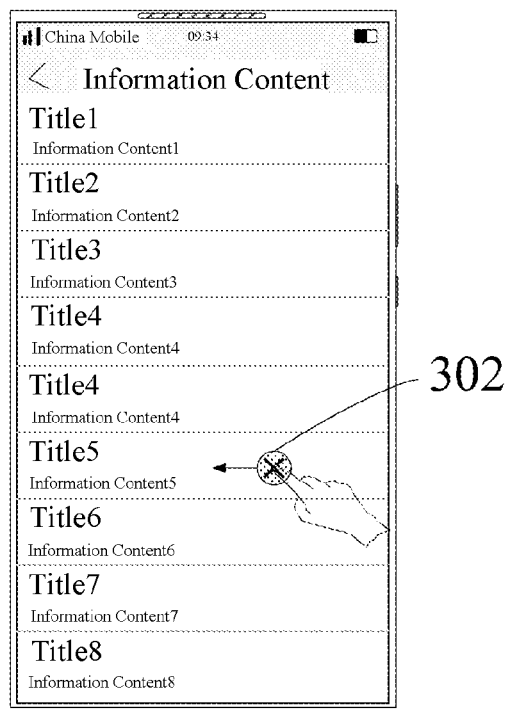
FIG. 4 is a schematic diagram of a display interface for another method for processing entry information provided by an embodiment of the present disclosure.

For example, reference can be made to the schematic diagram of the display interface shown in FIG. 4. In FIG. 4, when the sliding distance of the sliding operation does not reach the second threshold, only the deletion prompt control 302 (the body 302-1 in FIG. 3C) is controlled to move continuously as the user slides. In this case, the adhesive part 302-2 is not involved, and the user is prompted only through the deletion prompt control 302.

Figure 5:
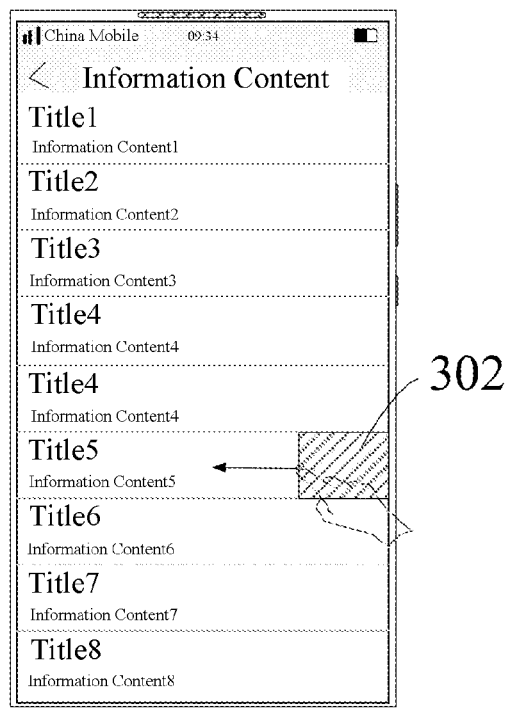
FIG. 5 is a schematic diagram of a display interface for another method for processing entry information provided by an embodiment of the present disclosure.

For example, reference can be made to the schematic diagram of the display interface shown in FIG. 5. In FIG. 5, the deletion prompt control is a color prompt control, which is used to prompt the deletion even with a color (a second color, marked as diagonal stripes in FIG. 5) different from the color of background (a first color) of the entry information. For example, in FIG. 5, if the user's finger slides to the left, the deletion prompt control 302 with the second color extends to the left from a right edge position of the entry information (or the right edge position of the screen), and the extension length is relevant to the sliding distance. For example, the extension length can be equal to the sliding distance, as shown in FIG. 5, the second color extends to the position where the user's finger slides to. Alternatively, the extension length can be slightly shorter than the sliding distance, such as ⅔ of the sliding distance, or the sliding distance minus 5 mm length, etc. In this way, the extension length can be on the side where the finger slides, which is convenient for the user to watch.

In S206, when the sliding distance reaches a second threshold, the entry information is processed according to the target event, the second threshold being greater than the first threshold.

Specifically, this step can be implemented in at least the following manners.

In a first manner, when the sliding distance reaches the second threshold, the user's finger can continue to slide (for example, it can still slide to the left or right in FIG. 3), and when the sliding distance at a time when the sliding finishes reaches the second threshold, the entry information is then processed according to the target event. In this manner, it gives the user more opportunities for choices. For example, after the sliding distance is greater than the second threshold, the user does not want to delete the entry information. At this time, the user can slide to the right without lifting the finger so that the sliding distance becomes less than the second threshold, and the deletion event can be cancelled. The user can select and confirm for the second time whether to execute the target event.

In a second manner, when the sliding distance reaches the second threshold, the entry information is processed immediately according to the target event. At this time, the user is no longer provided with an opportunity for secondary selection, and the processing is performed as long as the sliding distance in the sliding operation reaches the second threshold. At this time, even if the user's finger continues to slide to the left or right, it will no longer affect the result of processing the entry information according to the target event. This implementation is simpler, and has a small amount of data to be processed and fast response, which is beneficial to improve the processing efficiency of the entry information.

Still as shown in FIG. 3, FIG. 3D also shows a schematic diagram of the display interface at this stage. At this time, the sliding distance reaches the second threshold, and the deletion prompt control 302 is presented in a second form as shown in FIG. 3D. In this second form, the main body 302-1 is disconnected from the adhesive part 302-2. Specifically, in the process from FIG. 3C to FIG. 3D, it can be presented in such an effect that the flexible object is extended and broken off. In addition, FIG. 3E shows a final display interface. In this information display interface, the entry information 301 has been deleted.

It should be noted that, in some implementation scenarios, the state of the deletion prompt control 302 as shown in 3B of FIG. 3 is maintained for a very short time, and sometimes it may be not even perceived by the user. Alternatively, in some other implementation scenarios, the state as shown in 3B of FIG. 3 may also be an initial state of the first form as shown in FIG. 3C.

In the foregoing implementation scenarios, the event prompt control may have at least the following two display forms in continuous movement.

In a first manner, the event prompt control has two display forms, i.e., a first form and a second form, and the two display forms correspond to two stages S204 and S206, respectively.

Specifically, when the sliding distance does not reach the second threshold, the event prompt control is displayed in the first form. In the first form, the event prompt control includes the main body and the adhesive part, the main body is connected with the adhesive part, and the main body moves continuously with the sliding operation.

When the sliding distance reaches the second threshold, the event prompt control is displayed in the second form, and in the second form, the main body is disconnected from the adhesive part.

In a second manner, the event prompt control has three display forms, i.e., the main body, the first form and the second form. These three display forms correspond to the three stages of the target event on a one-to-one basis.

Specifically, when the sliding distance does not reach the first threshold, the main body of the event prompt control is displayed.

When the sliding distance does not reach the second threshold, the event prompt control is displayed in the first form. In the first form, the event prompt control includes the main body and the adhesive part, the main body is connected with the adhesive part, and the main body moves continuously with the sliding operation.

When the sliding distance reaches the second threshold, the event prompt control is displayed in the second form, and in the second form, the main body is disconnected from the adhesive part.

In addition, in an embodiment of the present disclosure, it may include the following step: in response to that the sliding distance does not reach the second threshold when the sliding operation is stopped, cancelling the target event.

In other words, if in the first stage or the second stage, the user lifts his/her finger and stops the sliding operation, the entry information will not be processed according to the target event, for example, not being deleted. At this time, if the user lifts his/her finger in the second stage, since the target event has already been activated, it may be necessary to cancel the target event.

Figure 6:
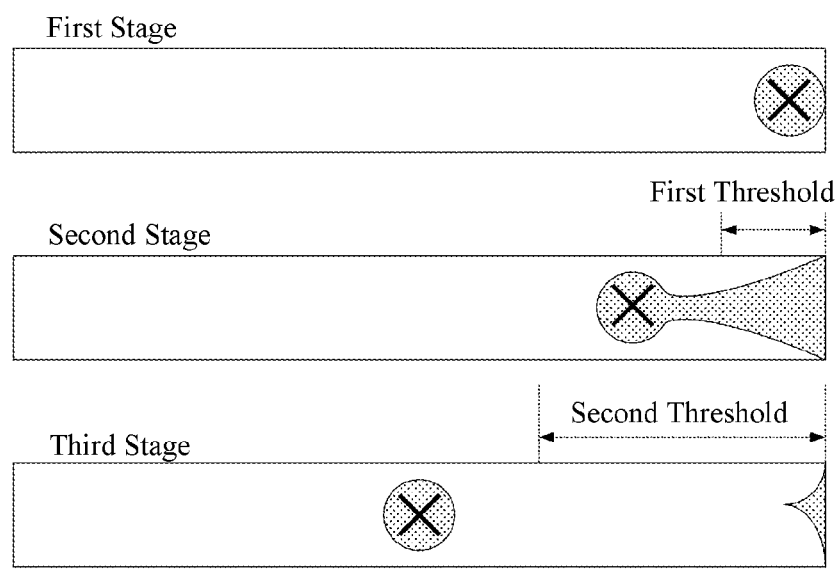
FIG. 6 is a schematic diagram of display changes of an event prompt control in a method for processing entry information provided by the embodiment of the present disclosure.

In summary, referring to FIG. 6, the process of performing the sliding operation to process the entry information can be divided into the following three stages.

In a first stage, the sliding operation is detected, the target event can be determined accordingly, and the event prompt control for the target event is displayed.

In the second stage, the sliding continues on the basis of the first stage, and when the sliding distance reaches the first threshold but does not reach the second threshold, the target event is activated. As shown in FIG. 6, in this stage, a visual prompt can be provided to the user through the event prompt control, which is convenient for the user to operate.

In the third stage, the sliding continues on the basis of the second stage, and when the sliding distance reaches the second threshold, the target event is triggered, that is, the entry information is processed according to the target event. In this case, as shown in FIG. 6, the event prompt control can also be used to provide the visual prompt to the user at this stage.

In this way, according to the present solution, the target event can be divided into three stages (as described above), and there is a correspondence between the length of the gesture sliding distance and each of the three stages of the target event. During the sliding process, as the sliding distance changes, the event prompt control is controlled to move continuously, which can simulate the effect of the flexible object being stretched and then broken. And in this process, if the sliding is stopped in the first stage or the second stage, cancelling of the target event can be triggered, but after entering the third stage, if the sliding continues, or as long as it enters the third stage, the target event can be triggered, that is, the entry information is processed according to the target event.

Through the foregoing processing, according to the technical solutions provided by the embodiments of the present disclosure, the entry information is processed by detecting the sliding operation on the entry information by the user. In this process, in response to detecting the sliding operation, the event prompt control of the target event corresponding to the sliding operation can be displayed. Therefore, with the movement of the user's finger, when the sliding distance reaches the first threshold, the target event can be activated. In this process, the user can also choose whether to continue to trigger the target event or not, giving the user a second chance for selection. If the sliding distance reaches the second threshold, the target event is triggered and the entry information is processed accordingly. Therefore, in the technical solutions provided by the embodiments of the present disclosure, the user only needs to perform the sliding operation on the entry information, and perform the secondary confirmation on the target event during the sliding operation, which not only gives the user a chance for selection so as to reduce the possibility of information lost caused by inadvertent operation, but also simplifies the operation steps to a certain extent, improves the continuity and convenience of the operation, and improves the efficiency of information processing.

As mentioned above, the target event involved in the embodiments of the present disclosure includes but is not limited to the deletion event, the marking event, the hiding event, or the communication event.

Then, in S202, when the user's sliding operation is detected, determining the target event corresponding to the sliding operation may be implemented according to the operation information of the sliding operation. Specifically, the operation information of the sliding operation may include, but is not limited to, one or more of a start position, a sliding direction, and pressing strength of the sliding operation. In other words, the target event corresponding to the sliding operation may be determined according to one or more of the sliding direction and the pressing strength of the sliding operation.

In an actual implementation scenario, the operation information corresponding to the various events can be preset. In this way, the target event corresponding to the currently detected sliding operation can be determined only by comparing the operation information of the detected sliding operation with the preset operation information corresponding to the various events.

Specifically, when the target event is the deletion event, in step S206, it only needs to delete the entry information.

When the target event is the hiding event, in step S206, the entry information is hidden. That is, an attribute (or display attribute) of the entry can be set as hidden, so that the entry information is not visible in the information list, but it is not deleted. The user can make the hidden entry information visible through the setting function of the terminal or by modifying the display attribute, or can modify the hidden entry information to be visible, which is not particularly limited in the embodiments of the present disclosure.

When the target event is the marking event, in step S206, there may be various marking methods. For example, when the target event is the marking event, the entry information may be marked as read; an urgency (or importance) level may be marked for the entry information; or the entry information may be marked as Need to be reminded.

In the actual implementation, one marking event can be set, or multiple marking events can be set, as long as the operation information corresponding to any two marking events are different from each other. For example, for the marking event of marking as read, its operation information may be sliding to the right plus heavy pressure; for another example, for the marking event of marking as Need to be reminded, its operation information may be sliding to the right plus light pressure. There may also be other variations in the actual scene, which are not intended to limit the scope of the solutions of the present disclosure.

In this embodiment, after making the entry information as Need to be reminded, the user can be reminded according to a preset reminding timing, or in a preset reminding interval and a preset number of times of reminding. The reminding manner can be preset in advance, and may include but is not limited to one or more of a sound reminder (for example, playing music or outputting voice prompt information), a vibration reminder, a text reminder, a light reminder (for example, light flashing, lighting, etc.).

In addition, for the urgency level marked for the entry information, different urgency levels can also be preset. As mentioned above, it only needs to ensure that the operation information of any two target events are different from each other. When performing marking, different markings can be used for different urgency levels. For example, for the entry information in an email list (an email in this scenario), for the operation of sliding to the left plus heavy pressure on the email, the email can be marked in a red label, indicating the highest urgency level; for the operation of sliding to the left plus light pressure on the email, the email can be marked in a yellow label, indicating the second highest urgency level; and the email with no label is of the lowest urgency level.

When the target event is the communication event, in step S206, an interface for sending a communication request may be displayed, and the recipient of the communication request is the user to which the entry information belongs. Similar to the marking event, there can also be multiple communication manners for the communication event. For example, it includes call communication, audio and video communication (audio and video conferences, voice calls, video calls, etc.), information communication (for example, SMS communication, sending messages through third-party software, sending emails, etc.). Therefore, the communication request sent may include, but is not limited to, one or more of a call communication request, an audio and video communication request, and an information communication request.

It can be understood that the display form of the event prompt control corresponding to each of the target events may be different, which is not particularly limited in the embodiments of the present disclosure.

Based on different communication events, the user can perform editing or processing on the sending interface to send the communication request; or in some scenarios, the communication request can also be sent automatically. For example, if the target event is the call communication event, in S206, the telephone number of the entry information can be directly dialed without any user operation, so that the entry information can be automatically processed quickly. For another example, if the target event is the email communication event, in S206, an email plug-in or an email application (APP) may be invoked through the email interface so as to enter the email sending interface. In this case, the user needs to edit on the email interface, and send the email through the touch terminal device.

It should still be noted that in the embodiments of the present disclosure, multiple events may be preset for the same entry information, and the operation information corresponding to any two events are different from each other.

For example, in a possible implementation scenario, the user may slide to the right or left on a short message (entry information) in the short message list. In this case, sliding to the right is the call communication event, and sliding to the left is the SMS communication event.

For example, in another possible implementation scenario, the user may slide to the right or left on the call record (entry information) in a missed call list. In this case, sliding to the right is the call communication event, and sliding to the left is the deletion event.

For example, in another possible implementation scenario, the user may slide to the right or left on product information (entry information) in a shopping cart list. In this case, sliding to the right is the reminding event, and sliding to the left is the deletion event.

In addition to the sliding direction, the pressing strength may also be involved. In the embodiments of the present disclosure, for the convenience of description, the pressing strength is divided into "light pressure" and "heavy pressure", where the heavy pressure indicates that the pressing strength is greater than a preset pressing strength threshold, and the light pressure indicates that the pressing strength is less than the preset pressing strength threshold. Depending on actual situations, when the pressing strength is equal to the pressing strength threshold, it may be the either heavy pressure or the light pressure.

In this case, the operation information corresponding to each of the events may be preset in combination with the sliding direction and the pressing strength.

In an exemplary embodiment, reference may be made to the implementation as shown in Table 1.

TABLE 1

| Event | Sliding direction | Pressing strength |
| --- | --- | --- |
| Deletion event | To the left | Light pressure |
| Marking event | To the right | Light pressure |
| Hiding event | To the left | Heavy pressure |
| Communication event | To the right | Heavy pressure |

It can be understood that the embodiment shown in Table 1 is only a possible embodiment, and is not intended to limit the scope of the solutions. For example, the operation information corresponding to the above deletion events can also be interchanged. For example, the operation information corresponding to the deletion event can be sliding to the right, and the pressing strength is light pressure; and for example, the operation information corresponding to the hiding event can be sliding to the left, and pressing strength is light pressure, which will not be detailed here.

It can be understood that, some or all of the steps or operations in the foregoing embodiments are only examples, and other operations or variations of various operations may also be performed in the embodiments of the present application. Furthermore, the steps may be performed in an order different from that presented in the above-described embodiments, and it is also possible that not all the operations in the above-described embodiments are performed.

As used herein, although the terms "first", "second", etc. may be used in the present disclosure to describe various thresholds, these thresholds should not be limited by these terms. These terms are only used to distinguish one threshold from another. For example, without changing the meaning of the description, the first threshold may be called the second threshold, and similarly, the second threshold may be called the first threshold, as long as all the "first threshold" as used herein are named consistently and all the "second threshold" as used herein are named consistently. The first threshold and the second threshold are both thresholds, and may not be the same threshold.

The terms used in the present disclosure are merely used to describe the embodiments and not intended to limit the claims. As used in the description of the embodiments and the claims, the singular forms of "a", "an" and "the" are intended to include the plural forms as well, unless the context clearly dictates otherwise. Similarly, the term "and/or" as used in the present disclosure is meant to include any and all possible combinations of one or more of those listed in association. Additionally, as used herein, the term "comprise" and its variations "comprises" and/or comprising and so on refer to presence of stated features, integers, steps, operations, elements, and/or components, and do not preclude the presence or addition of one or more other features, integers, steps, operations, elements, components and/or groupings thereof.

Embodiment 2

Based on the method for processing the entry information provided in the above-mentioned embodiment 1, the embodiments of the present disclosure further provide an embodiment of a device for implementing the steps of the method in the above-mentioned method embodiment.

Figure 7:
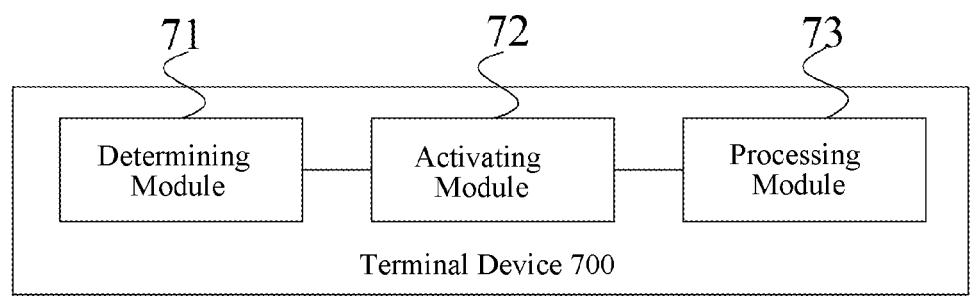
FIG. 7 is a functional block diagram of a terminal device according to an embodiment of the present disclosure.

An embodiment of the present disclosure provides a terminal device. Referring to FIG. 7, the terminal device 700 includes:

a determining module 71 configured to, in response to a sliding operation for entry information, determine a target event corresponding to the sliding operation;

an activating module 72, configured to activate the target event when a sliding distance of the sliding operation reaches a first threshold; and a processing module 73, configured to process the entry information according to the target event when the sliding distance reaches a second threshold, the second threshold being greater than the first threshold.

In an embodiment, the processing module 73 is further configured to:

display an event prompt control for the target event; and
control the event prompt control to move continuously with the sliding operation.

In specific, the processing module 73 is specifically configured to:

when the sliding distance does not reach the second threshold, display the event prompt control in a first form, where in the first form, the event prompt control includes a main body and an adhesive part, the main body is connected with the adhesive part, and the main body moves continuously with the sliding operation; and when the sliding distance reaches the second threshold, display the event prompting control in a second form, where in the second form, the main body is disconnected from the adhesive part.

In specific, the processing module 73 is specifically configured to:

display a main body of the event prompting control when the sliding distance does not reach the first threshold;

display the event prompt control in a first form when the sliding distance does not reach the second threshold, where in the first form, the event prompt control includes the main body and an adhesive part, the main body is connected with the adhesive part, and the main body moves continuously with the sliding operation; and display the event prompt control in a second form when the sliding distance reaches the second threshold, where in the second form, the main body is disconnected from the adhesive part.

In another embodiment, the processing module 73 is further configured to cancel the target event in response to the sliding distance at a time when the sliding operation is stopped does not reach the second threshold.

In the embodiments of the present disclosure, the target event includes: a deletion event, a marking event, a hiding event, or a communication event.

In another embodiment, the determining module 71 is specifically configured to:

determine the target event corresponding to the sliding operation according to one or more of a sliding direction and pressing strength of the sliding operation.

In a specific embodiment, when the target event is the deletion event, the processing module 73 is specifically configured to: delete the entry information.

In a specific embodiment, when the target event is the marking event, the processing module 73 is specifically configured to:

mark the entry information as read; or
mark an urgency level for the entry information; or
mark the entry information as Need to be reminded.

In a specific embodiment, when the target event is the hiding event, the processing module 73 is specifically configured to: hide the entry information.

In a specific embodiment, when the target event is the communication event, the processing module 73 is specifically configured to:

display an interface for sending a communication request, where the recipient of the communication request is the user to which the entry information belongs;

wherein the communication request includes one or more of a call communication request, an audio and video communication request, and an information communication request.

A terminal device 700 in the embodiment shown in FIG. 7 can be used to implement the technical solutions of the foregoing method embodiments. For the implementation principle and technical effect, reference may be made to the related descriptions in the method embodiments. Optionally, the terminal device 700 may be a server or a terminal.

It should be understood that the division of the modules of the terminal device 700 shown in FIG. 7 is only a division of logical functions, and in actual implementations, all or some of the modules can be integrated into one physical entity, or may be physically separated. And these modules can all be implemented in the form of software invoked through the processing element; or can all be implemented in hardware; and it is also possible that some of the modules can be implemented in the form of software invoked through the processing element and some of the modules can be implemented in hardware. For example, the processing module 73 can be a separate processing element, or can be integrated in the terminal device 700, such as in a certain chip of the terminal, or can also be stored in the memory of the terminal device 700 in the form of a program, which can be invoked by a certain processing element of the device 700 to perform the functions of the above modules. The implementation of other modules is similar thereto. In addition, all or part of these modules can be integrated together, or can be implemented independently. The processing element described here may be an integrated circuit with signal processing capability. In the implementation process, the steps of the above-mentioned methods or the above-mentioned modules can be accomplished by integrated logic circuits in hardware in the processor element or an instruction in the form of software.

For example, the above modules may be one or more integrated circuits configured to implement the above methods, such as one or more application specific integrated circuits (ASIC), one or more microprocessors (digital signal processors, DSPs), one or more field programmable gate arrays (FPGAs), or the like. For another example, when one of the above modules is implemented in the form of a processing element invoking a program, the processing element may be a general-purpose processor, such as a central processing unit (CPU) or other processors that can invoke the program. For another example, these modules can be integrated together and implemented in the form of a system-on-a-chip (SOC).

Figure 8:
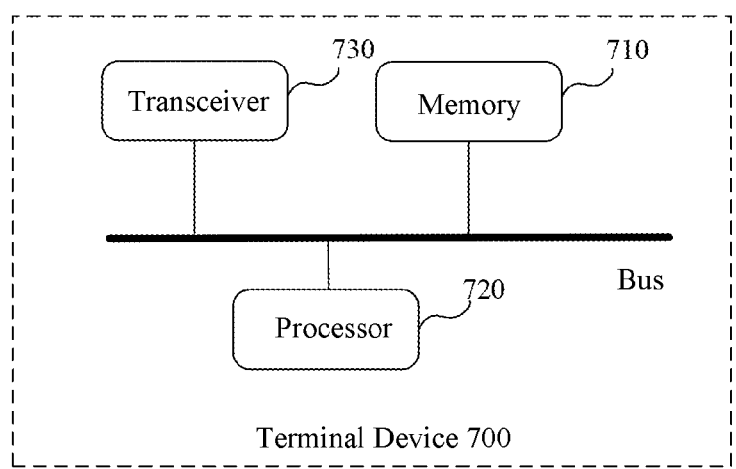
FIG. 8 is a schematic diagram of a physical structure of a terminal device according to an embodiment of the present disclosure.

An embodiment of the present disclosure provides a terminal device. Referring to FIG. 8, the terminal device 700 includes:

a memory 710;

a processor 720; and a computer program, wherein the computer program is stored in the memory 710 and configured to be executed by the processor 720 to implement the method as described in the above embodiments.

The number of processors 720 in the terminal device 700 may be one or more, and the processor 720 may also be referred to as a processing unit, which may implement certain control functions. The processor 720 may be a general-purpose processor or a special-purpose processor, or the like. In an optional design, the processor 720 may also store instructions, and the instructions may be executed by the processor 720 to cause the terminal device 700 to perform the methods described in the foregoing method embodiments.

In yet another possible design, the terminal device 700 may include circuitry, and the circuitry may implement the sending, receiving or communicating functions in the foregoing method embodiments.

Optionally, the number of memories 710 in the terminal device 700 may be one or more, the memory 710 stores instructions or intermediate data, and the instructions can be executed on the processor 720, to cause the terminal device 700 to perform the methods described in the above method embodiments. Optionally, the memory 710 may also store other related data. Optionally, the instructions and/or data may also be stored in processor 720. The processor 720 and the memory 710 can be provided separately or integrated together.

In addition, as shown in FIG. 8, the terminal device 700 is also provided with a transceiver 730, the transceiver 730 may be called a transceiving unit, a transceiving machine, a transceiving circuit, or a transceiver, and is configured to communicate with test equipment or other terminal device for data transmission or communication, which will not be detailed here.

As shown in FIG. 8, the memory 710, the processor 720 and the transceiver 730 are connected and communicated through a bus.

If the terminal device 700 is used to implement the method corresponding to FIG. 2, for example, the transceiver 730 can send the packet under test to each test terminal, and the transceiver 730 can also be used to receive the test running data fed back by each test terminal. The processor 720 is used to accomplish corresponding determination or control operations, and optionally, to store corresponding instructions in the memory 710. For the specific processing manner of each component, reference may be made to the relevant descriptions of the foregoing embodiments.

In addition, an embodiment of the present disclosure provides a readable storage medium on which a computer program is stored, and the computer program is executed by a processor to implement the method described in the embodiment 1.

Since the modules in this embodiment can perform the method shown in Embodiment 1, for parts that are not described in detail in this embodiment, reference may be made to the relevant description of Embodiment 1.

After considering the description and practicing the disclosure herein, those skilled in the art will readily contemplate other embodiments of the disclosure. The disclosure is intended to cover any variations, uses, or adaptions of the disclosure that conform to the general principles of the disclosure and include common knowledge or conventional technical means in the technical field which are not disclosed in the disclosure. It is intended that the description and embodiments shall be considered as exemplary only, and the true scope and spirit of the disclosure are indicated by the appended claims.

What is claimed is:

1. A method for processing entry information, comprising:

in response to a sliding operation for entry information, determining a target event corresponding to the sliding operation, wherein the sliding operation refers to one operation without lifting finger for the entry information;

activating the target event when a sliding distance of the sliding operation reaches a first threshold; and processing the entry information according to the target event when the sliding distance reaches a second threshold, wherein the second threshold is greater than the first threshold, wherein the method further comprises:

displaying an event prompt control for the target event;

displaying a main body of the event prompt control when the sliding distance does not reach the first threshold;

displaying the event prompt control in a first form when the sliding distance does not reach the second threshold, wherein in the first form, the event prompting control comprises the main body and an adhesive part, the main body is connected with the adhesive part, and the main body moves continuously with the sliding operation, and displaying the event prompt control in a second form when the sliding distance reaches the second threshold, wherein in the second form, the main body is disconnected from the adhesive part.

2. The method according to claim 1, further comprising:

in response to that the sliding distance does not reach the second threshold when the sliding operation is stopped, cancelling the target event.

3. The method according to claim 1, wherein the target event comprises: a deletion event, a marking event, a hiding event, or a communication event.

4. The method according to claim 3, wherein the determining the target event corresponding to the sliding operation comprises:

determining the target event corresponding to the sliding operation according to one or more of a sliding direction and pressing strength of the sliding operation.

5. The method according to claim 3, wherein, when the target event is the deletion event, the processing the entry information according to the target event comprises:

deleting the entry information.

6. The method according to claim 3, wherein when the target event is the marking event, the processing the entry information according to the target event comprises:

marking the entry information as read; or marking an urgency level for the entry information; or marking the entry information as Need to be reminded.

7. The method according to claim 3, wherein when the target event is the hiding event, the processing the entry information according to the target event comprises:

hiding the entry information.

8. The method according to claim 3, wherein when the target event is the communication event, the processing the entry information according to the target event comprises:

displaying an interface for sending a communication request, wherein a recipient of the communication request is a user to which the entry information belongs;

wherein the communication request comprises one or more of a call communication request, an audio and video communication request, and an information communication request.

9. A terminal device, comprising: a memory; a processor; and a computer program, wherein the computer program is stored in the memory and configured to be executed by the processor to implement operations comprising: in response to a sliding operation for entry information, determining a target event corresponding to the sliding operation, wherein the sliding operation refers to one operation without lifting finger for the entry information; activating the target event when a sliding distance of the sliding operation reaches a first threshold; and processing the entry information according to the target event when the sliding distance reaches a second threshold, wherein the second threshold is greater than the first threshold, wherein the terminal device further comprises: displaying an event prompt control for the target event; displaying a main body of the even prompt control when the sliding distance does not reach the first threshold; displaying the event prompt control in a first form when the sliding distance does not reach the second threshold, wherein in the first form, the event prompting control comprises the main body and an adhesive part, the main body is connected with the adhesive part, and the main body moves continuously with the sliding operation, and displaying the event prompt control in a second form when the sliding distance reaches the second threshold, wherein in the second form, the main body is disconnected from the adhesive part.

10. The terminal device according to claim 9, wherein the operations further comprise:

in response to that the sliding distance does not reach the second threshold when the sliding operation is stopped, cancelling the target event.

11. The terminal device according to claim 9, wherein the target event comprises: a deletion event, a marking event, a hiding event, or a communication event.

12. The terminal device according to claim 11, wherein the determining the target event corresponding to the sliding operation comprises:

determining the target event corresponding to the sliding operation according to one or more of a sliding direction and pressing strength of the sliding operation.

13. The terminal device according to claim 11, wherein when the target event is the deletion event, and the processing the entry information according to the target event comprises:

deleting the entry information, when the target event is the marking event, the processing the entry information according to the target event comprises:

marking the entry information as read; or marking an urgency level for the entry information; or marking the entry information as Need to be reminded, when the target event is the hiding event, the processing the entry information according to the target event comprises:

hiding the entry information, and when the target event is the communication event, the processing the entry information according to the target event comprises:

displaying an interface for sending a communication request, wherein a recipient of the communication request is a user to which the entry information belongs;

wherein the communication request comprises one or more of a call communication request, an audio and video communication request, and an information communication request.

14. A non-transitory computer-readable storage medium having a computer program stored thereon, wherein the computer program is executed by a processor to implement operations comprising: in response to a sliding operation for entry information, determining a target event corresponding to the sliding operation, wherein the sliding operation refers to one operation without lifting finger for the entry information; activating the target event when a sliding distance of the sliding operation reaches a first threshold; and processing the entry information according to the target event when the sliding distance reaches a second threshold, wherein the second threshold is greater than the first threshold, wherein the computer program further comprises: displaying an event prompt control for the target event; displaying a main body of the even prompt control when the sliding distance does not reach the first threshold; displaying the event prompt control in a first form when the sliding distance does not reach the second threshold, wherein in the first form, the event prompting control comprises the main body and an adhesive part, the main body is connected with the adhesive part, and the main body moves continuously with the sliding operation, and displaying the event prompt control in a second form when the sliding distance reaches the second threshold, wherein in the second form, the main body is disconnected from the adhesive part.

\* \* \* \* \*